(12) United States Patent
Wang et al.

(10) Patent No.: US 10,712,868 B2
(45) Date of Patent: Jul. 14, 2020

(54) HYBRID BASELINE MANAGEMENT

(71) Applicant: Synaptics Incorporated, San Jose, CA (US)

(72) Inventors: Ying Wang, San Jose, CA (US); Earl Peng, San Jose, CA (US); Jingwei Tan, Shenzhen (CN)

(73) Assignee: Synaptics Incorporated, San Jose, CA (US)

( * ) Notice: Subject to any disclaimer, the term of this patent is extended or adjusted under 35 U.S.C. 154(b) by 199 days.

(21) Appl. No.: 15/604,351

(22) Filed: May 24, 2017

(65) Prior Publication Data
US 2018/0341363 A1 Nov. 29, 2018

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04105* (2013.01); *G06F 2203/04107* (2013.01)

(58) Field of Classification Search
None
See application file for complete search history.

(56) References Cited

U.S. PATENT DOCUMENTS

| | | | | |
|---|---|---|---|---|
| 7,903,090 B2 * | 3/2011 | Soss | ...................... | G06F 3/0414 345/173 |
| 10,168,814 B2 * | 1/2019 | Hotelling | .............. | G06F 3/0414 |
| 2003/0210235 A1 * | 11/2003 | Roberts | ................. | G06F 3/0414 345/173 |
| 2006/0227115 A1 * | 10/2006 | Fry | ........................ | G06F 3/0416 345/173 |
| 2006/0293864 A1 * | 12/2006 | Soss | ...................... | G06F 3/0414 702/104 |
| 2008/0158176 A1 * | 7/2008 | Land | ..................... | G06F 3/0418 345/173 |
| 2011/0216016 A1 * | 9/2011 | Rosener | .................. | G06F 3/041 345/173 |
| 2014/0022206 A1 * | 1/2014 | van de Waerdt | ....... | G06F 3/044 345/174 |
| 2014/0198059 A1 * | 7/2014 | Gu | .......................... | G06F 3/041 345/173 |
| 2015/0109243 A1 * | 4/2015 | Jun | ......................... | G06F 3/044 345/174 |

* cited by examiner

*Primary Examiner* — Amare Mengistu
*Assistant Examiner* — Sarvesh J Nadkarni
(74) *Attorney, Agent, or Firm* — Ferguson Braswell Fraser Kubasta PC

(57) ABSTRACT

A processing system for force baseline management includes sensor circuitry configured to obtain capacitive sensing signals of a sensing region from sensor electrodes, and processing circuitry coupled to the sensor circuitry and configured to determine, from the capacitive sensing signals, force measurements and touch measurements. The processing circuitry is further configured to modify a force baseline at a decreased rate in response to determining a presence of an input object using the force measurements and an absence of the input object using the touch measurements.

21 Claims, 4 Drawing Sheets

HYBRID BASELINE MANAGEMENT

FIELD

This invention generally relates to electronic proximity sensor devices.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (such as opaque touchpads integrated in, or peripheral to, notebook or desktop computers) or in smaller computing systems (such as touch screens integrated in cellular phones).

SUMMARY

Baseline management for force detector is disclosed. In one or more embodiments, a processing system for force baseline management includes sensor circuitry configured to obtain capacitive sensing signals of a sensing region from sensor electrodes, and processing circuitry coupled to the sensor circuitry and configured to determine, from the capacitive sensing signals, force measurements and touch measurements. The processing circuitry is further configured to modify a force baseline at a decreased rate in response to determining a presence of an input object using the force measurements and an absence of the input object using the touch measurements.

An input device performing baseline management for force detector is disclosed. The input device includes sensor electrodes, and processing system configured to be connected to the sensor electrodes. The processing system is configured to obtain capacitive sensing signals of a sensing region from the sensor electrodes, determine, from the capacitive sensing signals, force measurements and touch measurements. The processing system is further configured to modify a force baseline at a decreased rate in response to a presence of the input object detected from the force measurements and the absence of the input object from the touch measurements.

A method for performing baseline management for force detector is disclosed. The method includes determining, from capacitive sensing signals, force measurements and touch measurements, and modifying a force baseline at a decreased rate in response to a presence of the first input object detected from the first force measurements and the absence of the first input object from the first touch measurements.

Other aspects will be apparent from the following description and the appended claims.

BRIEF DESCRIPTION OF DRAWINGS

Exemplary embodiment will be described in conjunction with the appended drawings, where like designations denote like elements.

DETAILED DESCRIPTION

Figure 1:
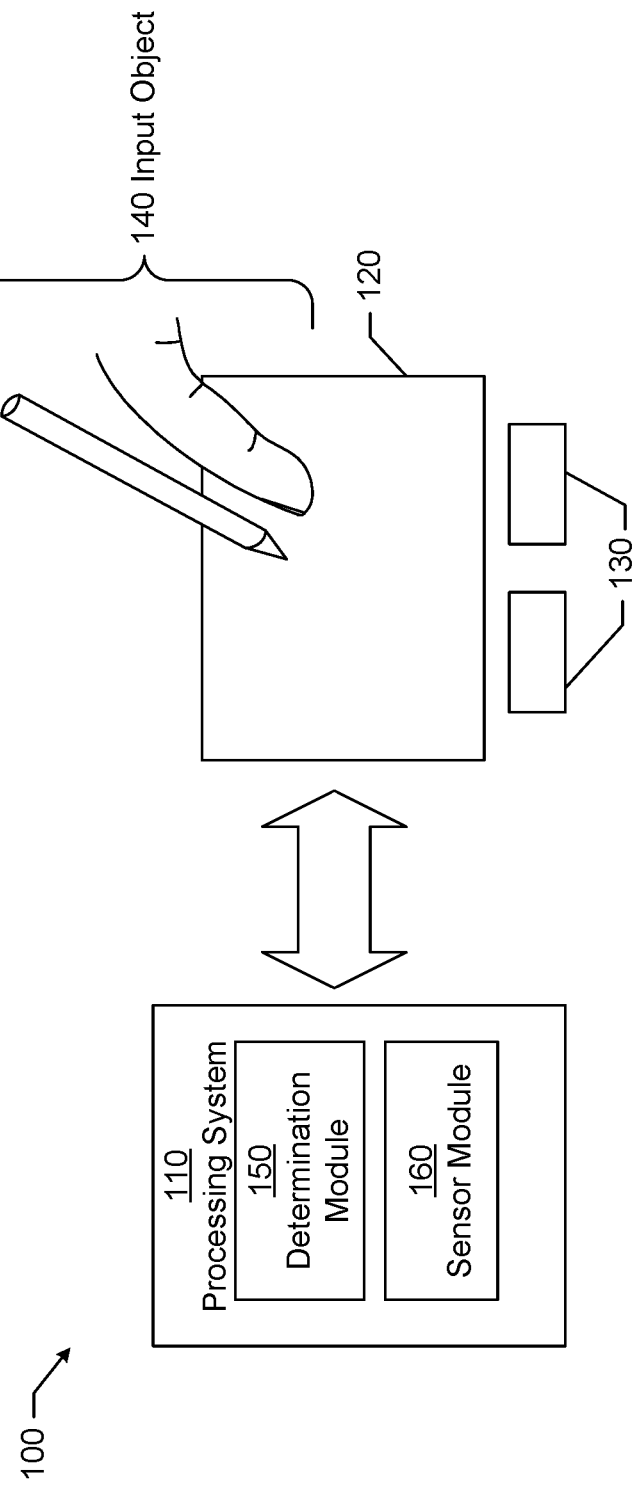
FIG. 1 is a block diagram of an example system that includes an input device in accordance with an embodiment of the disclosure.

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the technology. However, it will be apparent to one of ordinary skill in the art that embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods that facilitate improved usability, more specifically, improved baseline management for object detection using sensor electrodes. In general, a baseline is an estimation of the background capacitance that can affect sensor electrodes. In other words, the baseline can be considered as an estimate of the noise in the measurements observed by the sensor electrode. Thus, by subtracting the noise (i.e., baseline) from the signal measured by the sensor electrodes, the presence or absence of an object can be determined. As used in this disclosure, force baseline refers to the baseline for force sensor electrodes.

In one or more embodiments, the force baseline has an individual value for each force sensor electrode. Thus, the individual value in the force baseline is the estimate of the background capacitance for the corresponding force sensor electrode.

Because of the difference between the configuration of touch sensor electrodes as compared to the configuration of force sensor electrodes, baseline management for touch sensor electrodes is not the same as that for force sensor electrodes. As such, current baseline management is specific to the type of sensor electrodes used. More specifically, current baseline management for touch sensor electrodes only uses touch measurements. Similarly, current baseline management for force sensor electrodes only uses force measurements. Embodiments in this disclosure perform a hybrid baseline management in order to manage a force baseline. In other words, embodiments use a combination of touch measurements and force measurements in managing the force baseline. By using a combination, one or more embodiments account for a possible false detections of input objects in the force baseline. Further, one or more embodiments manage the force baseline in a manner to account for the rebound properties of the display.

Turning now to the figures, FIG. 1 is a block diagram of an exemplary input device (100), in accordance with embodiments of the technology. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (such as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. The signals on the transmitter electrodes are modulated relative to the signals on the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the disclosure. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the disclosure are described in the context of a fully-functioning apparatus, the mechanisms of the present technology are capable of being distributed as a program product (e.g., software) in a variety of forms. For example, the mechanisms of the present technology may be implemented and distributed as a software program on information-bearing media that are readable by electronic processors (e.g., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the technology may be located on a different node within the distributed system. The node may correspond to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
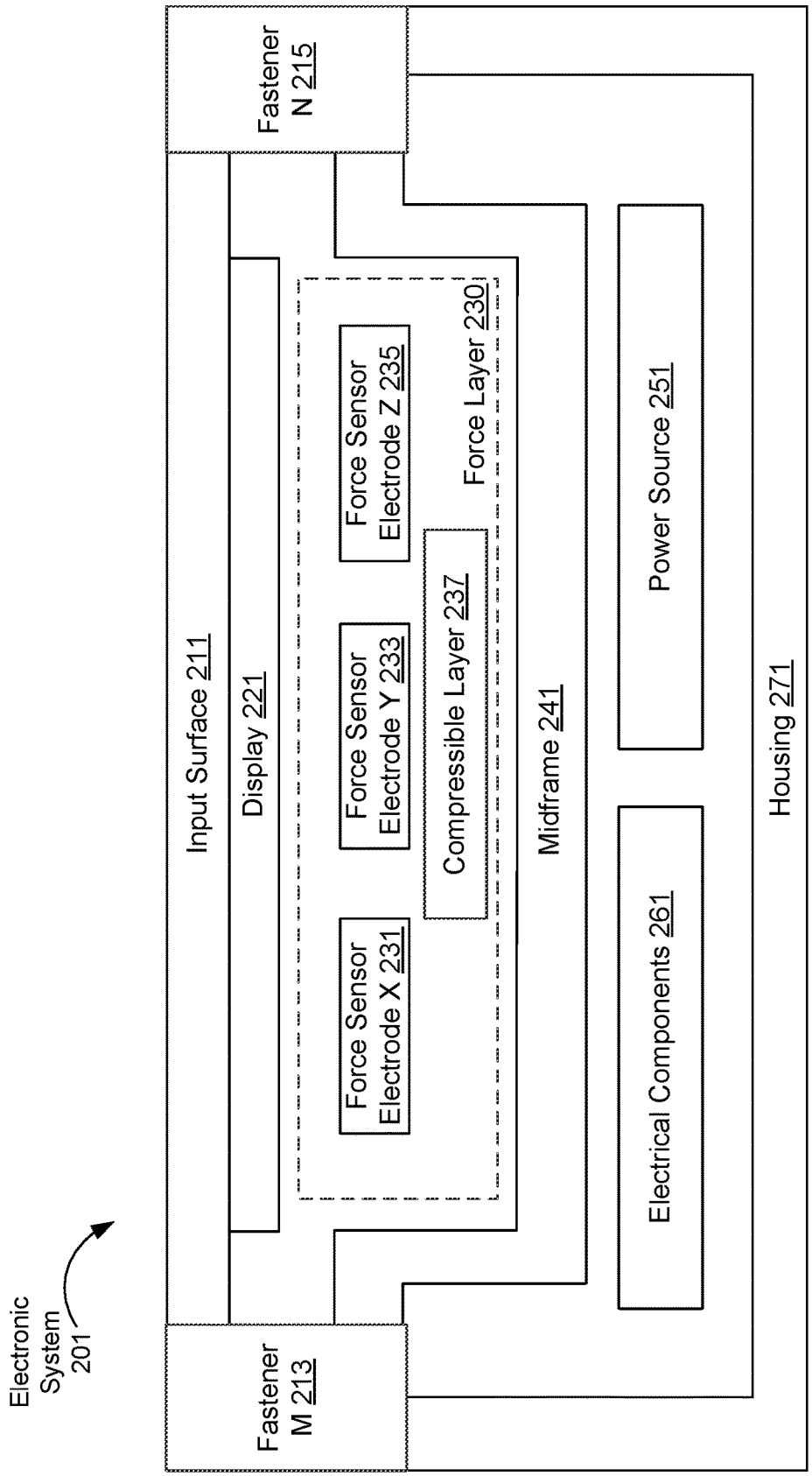
FIG. 2 is a side perspective diagram of an electronic system in accordance with one or more embodiments of the disclosure.

Turning to FIG. 2, FIG. 2 shows an example cross sectional diagram of an electronic system (201) in accordance with one or more embodiments. The electronic system (201) may be a smart phone, a tablet computing device, a touchscreen, a computing device with a touchpad, or other device. As shown in FIG. 2, an electronic system (201) may include an input surface (211), display (221), force sensor electrodes (e.g., force sensor electrode X (231), force sensor electrode Y (233), force sensor electrode Z (235)), a compressible layer (237), midframe (241), power source (251), electrical components (261), and housing (271). Each of these components is described below.

The housing (271) may be metal, plastic, other material, or a combination of materials. The housing (271) may be referred to as the frame of the electronic system (201) and may hold the input device.

The input device may include the input surface (211), display (221), and the compressible layer (237) as well as various components described above with reference to FIG. 1. The compressible layer may include air, a compressible material such as foam, or a combination of air and compressible materials. The input surface (211) is the surface of the input device that may be touched by an input object. For example, the input surface (211) may be glass or other material. The display (221) is a physical device that is configured to present visual information to a user. For example, the display (221) may be any type of light emitting diode (LED), organic LED (OLED), liquid crystal display (LCD), plasma, electroluminescence (EL), or other display technology. The input surface (211) and display (221) may have bending properties that define the amount of bending by the input surface (211) and display (221) in response to force at various positions along the input surface. In other words, the bending properties of the input surface (211) and display (221) refer to the amount of bend (i.e., deflection) of the input surface (211) and display (221) when subjected to an external force onto the input surface (211) and display (221). The input surface (211) and display (221) may be treated as having single bending properties or individual bending properties. Although FIG. 2 shows a distinct input surface (211) and display (221), the input surface may be an uppermost part of the display.

One or more fasteners (e.g., fastener M (213), fastener N (215)) may connect the input surface (211) and the display (221) to the housing (271) at attachment points. The fasteners may hold the display structure to the midframe (241). The display structure includes the input surface (e.g., cover glass or other material) which is attached to the display (221) by a layer of optically clear adhesive. The fastener may be an adhesive (e.g., weld, solder, cement, glue), crimping, a mounting bracket or other hardware connector, or other type of fastener. The attachment points are the points at which the fastener connects the input surface (211) and display (221) to the housing (271). For example, the attachment points may be around the edges of the display structure. Other attachment points may exist without departing from the scope of one or more embodiments. Amongst other factors, such as punch outs in the midframe (241), the fastener and locations of attachment points may affect the bending properties of the of the input surface (211) and display (221). In other words, the amount of bend may change depending on the type of fastener used and the location of the attachment points.

The electronic system (201) may further include various electrical components (261), and a power source (251). The electrical components (261) may include one or more circuit boards, such as a main board or printed circuit board assembly, that have various integrated circuits attached to the circuit boards. In another example, the electrical components (261) may include a processor, memory, and/or any other electrical devices for operating the electronic system (201).

Furthermore, the power source (251) may be hardware that includes functionality to provide electrical power to the electrical components (261), the force sensor electrodes (e.g., force sensor electrode X (231), force sensor electrode Y (233), force sensor electrode Z (235)), and a processing system (not shown). For example, the power source (251) may be a rechargeable battery with functionality to charge using an electric current obtained from an external power source connected to the electronic system (201).

In one or more embodiments, the electronic system (201) includes a midframe (241) disposed between the display (221) and the housing (271). For example, the midframe (241) may be a conductive material configured as an interior support frame, for example, for the electronic system (201). Moreover, the midframe (241) may be a piece of sheet metal, such as a shielding can. In one or more embodiments, the midframe (241) is a foil or plating layer attached to a non-conductive substrate. The midframe (241) may include various punch outs or cutouts for electrical and/or optical connectors that may affect the bending properties.

The force sensor electrodes (e.g., force sensor electrode X (231), force sensor electrode Y (233), force sensor electrode Z (235)) are sensor electrodes that are arranged so as to be electrically affected by a force applied to the input surface. Thus, measurements acquired using the force sensor electrodes indicate the amount of force applied to the input surface. Various arrangements of force sensor electrodes may be used. The following are a few example arrangements.

In particular, FIG. 2 shows an example in which the force sensor electrodes are attached to or as a part of the display. In such a scenario, absolute capacitive sensing may be used. In particular, when force is applied to the input surface (211), the compressible layer (237) compresses, causing the midframe (241) to be closer to the force sensor electrodes (e.g., force sensor electrode X (231), force sensor electrode Y (233), force sensor electrode Z (235)). Based on the decrease in distance between the force sensor electrodes and the midframe (i.e., the amount of bend or deflection), the absolute capacitance of a force sensor electrode changes, whereby the amount of change reflects the amount of the decrease and correspondingly the amount of force applied.

In another embodiment of the configuration of FIG. 2, transcapacitive sensing may be used. In such a scenario, a first subset of the force sensor electrodes adjacent to the display may be transmitter electrodes and a second subset of force sensor electrodes adjacent to the display may be receiver electrodes. By way of an example only, the first subset may be force sensor electrode Y (233) and the second subset may be force sensor electrode X (231) and force sensor electrode Z (235). The transmitter electrodes may transmit transmission signals and the receiver electrodes may receive resulting signals from the transmission signals. When a force is applied to the input surface (211), the compressible layer (237) compresses causing the midframe to be closer to the transmitter electrodes and receiver electrodes. The reduction of distance to the midframe changes the resulting signals received by the receiver electrodes as compared to the electronic system without force applied. Thus, the measurements of the resulting signals are affected by the amount of force applied.

By way of another configuration (not shown), a first subset of the force sensor electrodes may be located above the compressible layer and a second subset of the force sensor electrodes may be located below the compressible layer. Further, the midframe may or may not include conductive material. In the example, transcapacitive sensing between the first subset and second subset may be performed as described above to determine the amount of deflection of the first subset toward the second subset. The amount of deflection is indicative of the amount of force on the input surface (211).

In another example (not shown) electrodes of the display (221) may be used for both display updating and force and/or touch sensing. In other words, some of the electrodes used to update the display may be used to perform capacitive sensing. The capacitive sensing may be for force (e.g., based on capacitance being affected by an amount of compression of the compressible layer) and/or for touch (e.g., based on capacitance being affected by a position of an input object in the sensing region) to determine positional information.

The above are only a few examples. Other configurations of the electronic system to perform force sensing may be used. Each configuration may have a force baseline that is managed using one or more embodiments described herein.

Continuing with FIG. 2, because force sensor electrodes operate through the change in capacitance due to compression of the compressible layer, during the time for the compressible layer, the display, and input surface to recover once the force is removed, the capacitive measurements of the force sensor electrodes are still affected by the residual compression. Thus, the capacitive measurements of the force sensor electrodes still register the force even after accounting for the current force baseline (i.e., the most recent force baseline). Further, a rebound effect may occur whereby the amount of bending passes the norm in the opposing direction. In such a scenario of the rebound, a raw negative force may be reflected in the capacitive measurements after accounting for the current force baseline. If the force baseline is adjusted immediately, then the force baseline will not adequately reflect the background capacitance. Thus, once the compressible layer, display, and input surface return to the norm, a force may be detected. Accordingly, one or more embodiments wait before updating the force baseline. At the same time, one or more embodiments update the force baseline to account for possible error in the baseline.

Figure 3:
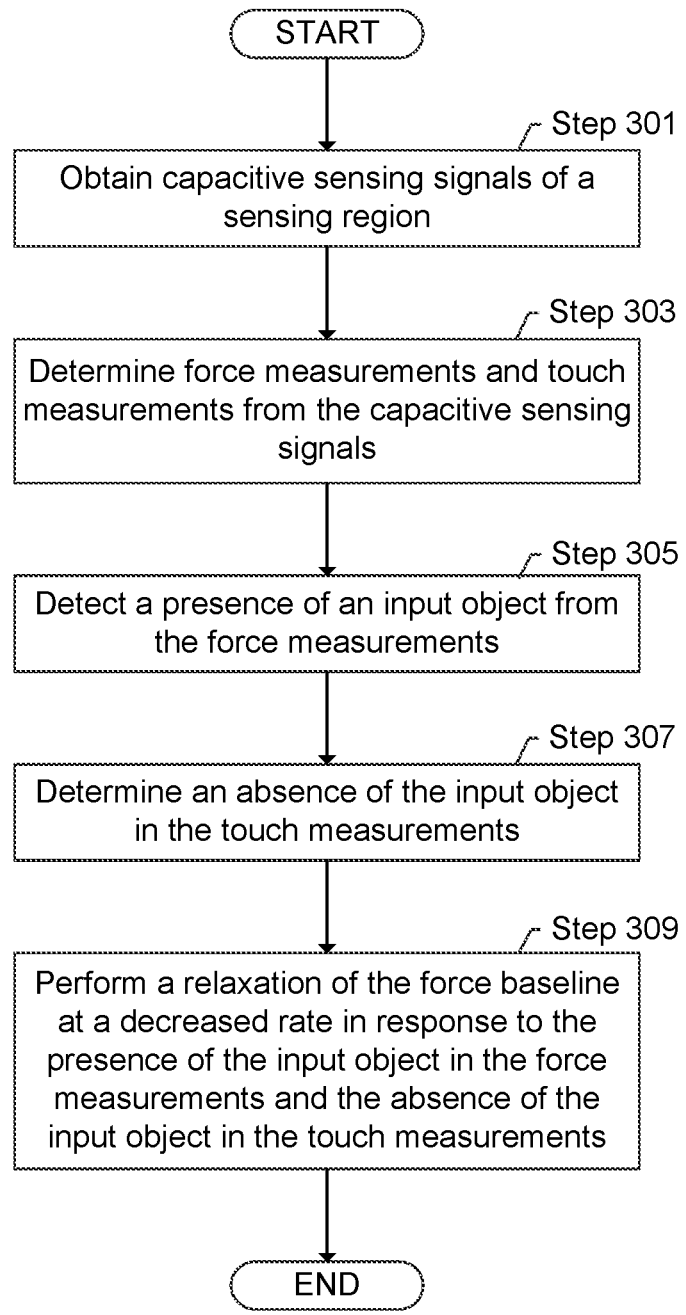
FIGS. 3 and 4 are flowcharts in accordance with one or more embodiments of the disclosure.
Figure 4:
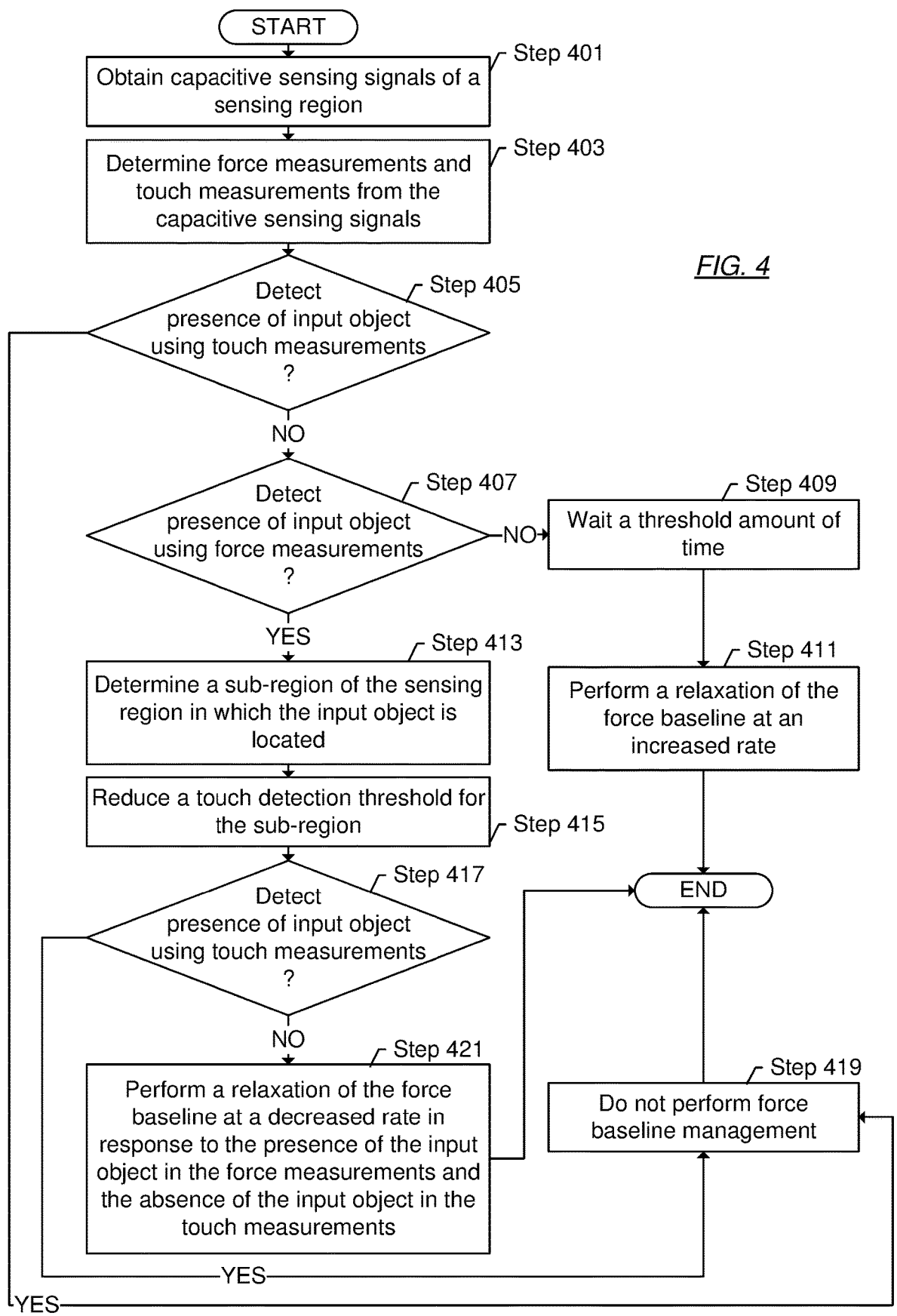

FIGS. 3 and 4 show flowcharts. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven. By way of an example, determination steps may not require a processor to process an instruction unless an interrupt is received to signify that condition exists. As another example, determination steps may be performed by performing a test, such as checking a data value to test whether the value is consistent with the tested condition.

FIG. 3 shows a flowchart in which force measurements indicate a presence of an input object while touch measurements indicate the absence of the input object. In other words, FIG. 3 shows an execution path of one or more embodiments.

In Step 301, capacitive sensing signals of a sensing region are obtained. Further, in Step 303, force measurements and touch measurements from the capacitive sensing signals are obtained. In particular, a raw image of the sensing region is obtained. In one or more embodiments, the raw image is from absolute and/or mutual capacitive measurements of the sensing region. Absolute capacitance is determined by determining the amount of electric charge added to a force sensor electrode to increase the electric potential of the force sensor electrode by one unit. In one or more embodiments of the invention, the amount of electric potential is affected by the distance to the housing and, subsequently, the compression of the compressible layer as affected by force. To determine the absolute capacitance, the force sensor electrodes are driven with a modulated sensing signal to determine the amount of electric charge. Measurements at each force sensor electrode are obtained. For example, the measurements may be obtained at once or at different times. Mutual capacitance measurements may be obtained by transmitting a transmitter signal with a transmitter electrode (e.g., a force sensor electrode). Resulting signals are received using another force sensor electrode, which is the receiver electrode. The resulting signals are affected by the distance between the transmitter electrode and receiver electrode and, subsequently, the compression of the compressible layer as affected by force. Regardless of whether mutual capacitive measurements or absolute capacitive measurements are used, the measurements may be combined into a raw force image.

Similarly, touch measurements may be acquired through absolute capacitive and/or mutual capacitive sensing. Sensor electrodes for touch are arranged to be affected by the presence of an input object on or near the input surface. Thus, a spike in touch measurements may be present at the location of the input object.

In Step 305, a presence of an input object is detected from the force measurements. In particular, the raw image may be normalized using the defined amount of force. If the raw image includes positional measurements (e.g., force sensor electrodes measure both touch and position), then the raw image is processed to remove the positional information. Further, the raw image is processed using the force baseline to obtain processed force measurements. For example, the force baseline may be piecewise subtracted from the raw image. Weights may be applied to the processed force measurements to account for the bending properties of the input surface. A cumulative response may be determined. From the cumulative response, the presence of the input object may be detected.

In Step 307, an absence of an input object is determined using the touch measurements. Similar to the force measurements, the touch measurements may be adjusted based on a touch baseline. By comparing the adjusted touch measurements to a touch detection threshold, a determination may be made whether an input object is present in the sensing region. In the instance shown in FIG. 3, the force measurements indicate the presence of the input object while the touch measurements indicate the absence of the input object. For example, a small input object that is applying force to the input surface may not be detectable by the touch sensor electrodes while the force applied may be detectable by the force sensor electrodes. By way of another example, the force baseline may be incorrect, resulting in an incorrect detection of force applied by an input object.

In Step 309, a relaxation of the force baseline at a decreased rate is performed in response to the presence of the input object in the force measurements and the absence of the input object in the touch measurements. In general, relaxation of the force baseline is to change the corresponding baseline values to be closer to the currently obtained measurement values of the force sensor electrodes. Thus, the force baseline moves closer to or relaxes toward the current measurement values of the force sensor electrodes. The rate of relaxation is the speed at which the baseline values moves closer to the current measurement values. The decreased rate is at a rate less than the normal rate for relaxing the baseline and may be referred to as "decreased rate relaxation." Normal rate is the rate of relaxation that the input device performs that is less than the "increased relaxation rate" discussed below. Normal rate relaxation may be performed when no input object has been detected by using the force sensors or touch sensors for the immediately preceding pre-defined period of time (e.g., 0.3-5 seconds). By way of another example, normal rate relaxation may be performed when an input object has not been detected since the screen is powered on. Normal rate may be referred to as "normal rate relaxation." The decreased relax gradually adjusts the force baseline over a series of capacitive frames to match the current capacitive force measurements.

For example, "decreased rate relaxation" and "normal rate relaxation" may be calculated as a weighted average of the current baseline value and the present force sensor value. The weights may be determined by the relaxation rate and may be based on the number of frames or time to perform the relaxation. A frame is the scanning of the sensing region to identify a current force state of the sensing region. At the end of the number of frames or time and without further change of the rate, the current baseline at the start of the relaxation is not in the present baseline. By way of a more specific example, the equations (Eq. 1 and Eq. 2) may be used.

$$B\_new_E = (1-w)*B\_old_E + w*Present_E \qquad \text{Eq. 1}$$

$$w = 1/\text{number\_frame} \qquad \text{Eq. 2}$$

In Eq. 1 and Eq. 2, E is the current force sensor electrode, $B\_new_E$ is the new baseline value for the force sensor electrode E, $B\_old_E$ is the previous baseline value for the force sensor electrode E, $Present_E$ is the current force sensor electrode value for the force sensor electrode E, w is the weight for the current force sensor electrode value, and number_frame is the number of frames over which the relaxation is performed.

Decreased rate relaxation has more than a threshold amount of time to perform the relaxation. Normal rate relaxation has less than the threshold amount of time. For example, the decreased rate may be a rate between 40 and 60 milliseconds. In the example, the normal rate may be less than 40 milliseconds. The amount of time for the relaxation may be translated to number of frames based on the average amount of time to perform a frame of sensing (e.g., amount of time for the relaxation/average amount of time to perform a frame of sensing=number of frames to perform the relaxation).

In one or more embodiments, one or more of the above decreased rate relaxation of the force baseline may include delaying performing any relaxation until after a preset duration of time after an input object is removed from the sensing region. In other words, in the case in which an input object is detected using force measurements and touch measurements, once the input object is removed, the processing system waits for the preset duration of time prior to adjusting force baseline. The length of the preset duration is the length of time for the input surface to return to a normal position. Normal position refers to a state of the input surface when an input object is not present and the amount of bend is static (i.e., the amount of bend of the input surface is not changing). By waiting for the preset duration time, the input surface may return to the normal position, and thus, the bend due to the input object is not absorbed into the baseline.

The above are only examples of performing the relaxation at a defined relaxation rate. Other techniques and equations may be used.

FIG. 4 shows a detailed flowchart in accordance with one or more embodiments of the invention. The Steps of FIG. 4 may be combined with the Steps of FIG. 3. For example, the Steps of FIG. 3 may be an embodiment of performing the Steps of FIG. 4.

In Step 401, capacitive sensing signals of a sensing region are obtained. In Step 403, force measurements and touch measurements are determined from the capacitive sensing signals in accordance with one or more embodiments of the invention. Obtaining the capacitive sensing signals and the touch and force measurements may be performed in a same or similar manner as Steps 301 and 303 of FIG. 3 as discussed above.

In Step 405, a determination is made whether the presence of the input object is detected using touch measurements. The touch measurements may be adjusted based on a touch baseline. By comparing the adjusted touch measurements to a touch detection threshold, a determination may be made whether an input object is present in the sensing region. In other words, if touch measurements exist that are greater than the touch detection threshold, then the presence of the input object may be determined. Conversely, if touch measurements does not exceed the touch detection threshold, then the absence of the input object is determined. Other processing may be performed on the touch measurements to determine whether the presence or absence of an input object is detected.

If a determination is made that an input object is present using the touch measurements, then force baseline management is not performed in Step 419. In other words, the current force baseline remains until no input object is detected using the touch measurements. Notably, the detected existence of the input object may be reflective of an error in the touch baseline. The touch baseline manager may update the touch baseline over one or more frames which may cause the erroneous presence to no longer exist. The force baseline may then be adjusted.

If an input object is not detected using the touch measurements, in Step 407, a determination is made whether the presence of the input object is detected using force measurements. In particular, the raw image may be normalized using the defined amount of force. If the raw image includes positional measurements (e.g., force sensor electrodes measure both touch and position), then the raw image is processed to remove the positional information. Further, the raw image is processed using the force baseline to obtain processed force measurements. For example, the force baseline may be piecewise subtracted from the raw image. Weights may be applied to the processed force measurements to account for the bending properties of the input surface. A cumulative response may be determined. From the cumulative response, the presence of the input object or absence of force applied by an input object is determined. For example, the cumulative response may be compared to a force detection threshold to determine whether force is being applied. An absence of force applied by an input object means that the input object is not detected using the force measurements.

If an input object is determined as absent using both the force measurements and the touch measurements, one or more embodiments wait a threshold amount of time in Step 409. Then, in Step 411, a relaxation of the force baseline is performed at an increased rate (i.e., increased rate relaxation). By waiting a threshold amount of time before performing the relaxation of the force baseline, one or more embodiments allow for the input surface, display, and compressible layer to return to the normal position without the effects of force apply. In other words, the wait accommodates the rebound effect as well as the residual compression to subside as discussed above with respect to FIG. 2. An example of the threshold amount of time may be a time between 500 milliseconds and 1 second. The increased rate may be an immediate relaxation (e.g., the current baseline=the current force measurements). After the increased rate relaxation and if no input object remains detected using the touch measurements and force measurements, the system may revert to normal rate relaxation.

Returning to Step 407, if the presence of an input object is detected, then in Step 413, a sub-region of the sensing region in which the input object is located is determined in accordance with one or more embodiments of the invention. From the force measurements, a determination may be made as to which sub-region reflects the presence of the input object. Each force measurement may be compared against a corresponding force detection threshold for the force sensor electrode to accommodate the various bending response across the sensing region. The sub-region having force measurements that satisfies the corresponding force detection threshold is identified.

In Step 415, a touch detection threshold is reduced for the sub-region. In other words, for the particular sub-region, the touch detection threshold is reduced. By reducing the touch detection threshold, one or more embodiments may accommodate a possibility that an input object exists but is not providing sufficient signal to be detected. Reducing the threshold may be performed by a defined percentage. For example, the new threshold may be 90% of the old threshold.

In Step 417, a determination is made whether the presence of the input object is detected using touch measurements. Step 417 may be performed in a same or similar manner to Step 405 with using the reduced touch detection threshold. If an input object is detected as existing using the touch measurements, the flow proceeds to Step 419. If an input object is not detected as existing using the touch measurements and the lower threshold, the flow proceeds to Step 421.

In Step 421, a relaxation of the force baseline at a decreased rate is performed in response to the presence of the input object in the force measurements and the absence of the input object in the touch measurements. Step 421 may be performed in a same or similar manner to Step 309 of FIG. 3.

One or more embodiments may be applied to multiple input objects. In such a scenario, the determinations discussed above may be with respect to whether any of multiple input objects are present in the sensing region. Further, changing the touch detection threshold for the sub-region may be for a particular sub-region in which an input object is determined to be present from the force measurements and not from the touch measurements.

Further, FIGS. 3 and 4 may be performed multiple times over different frames. Each of the multiple times may detect the same or different input object. Regardless of whether the same or different, the terms "first," "second," etc. may be used to describe input objects detected in different frames of capacitive sensing. Further, the terms "first," "second," etc. may be used to describe different detected input objects in the same frame of capacitive sensing.

Thus, the embodiments and examples set forth herein were presented in order to best explain the present technology and its particular application and to thereby enable those skilled in the art to make and use the technology. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for hybrid baseline management, the processing system comprising:
   sensor circuitry configured to obtain a first plurality of capacitive sensing signals of a sensing region from a plurality of sensor electrodes; and
   processing circuitry coupled to the sensor circuitry and configured to:
      determine, from the first plurality of capacitive sensing signals, a first plurality of force measurements and a first plurality of touch measurements for a current state of the sensing region,
      incorrectly detect a presence of a first input object in the sensing region from the first plurality of force measurements,
      detect an absence of the first input object in the sensing region from the first plurality of touch measurements, and
      perform a relaxation of a force baseline at a decreased rate in response to a presence of the first input object incorrectly detected from the first plurality of force measurements when the absence of the first input object is detected from the first plurality of touch measurements, the decreased rate being less than a normal rate of relaxation, the normal rate being used when no input object is detected in the sensing region using both touch measurements and force measurements.

2. The processing system of claim 1, wherein the sensor circuitry is further configured to obtain a second plurality of capacitive measurements, and wherein the processing circuitry is further configured to:
   determine, from the second plurality of capacitive sensing signals, a second plurality of force measurements and a second plurality of touch measurements,
   determine, from the second plurality of force measurements and the second plurality of touch measurements, an absence of a second input object from the sensing region, the second input object detected in a preceding frame, and
   after a threshold amount of time of determining the absence of the second input object, perform the relaxation of the force baseline.

3. The processing system of claim 2, wherein the threshold amount of time is a number of frames.

4. The processing system of claim 2, wherein, after the threshold amount of time, the relaxation of the force baseline is at an increased rate.

5. The processing system of claim 2, wherein, before the threshold amount of time, the relaxation of the force baseline is at the decreased rate.

6. The processing system of claim 1, wherein the processing circuitry is further configured to:
   determine, from the first plurality of force measurements, a sub-region of the sensing region in which the first input object is located,
   reduce a detection touch threshold to obtain a reduced detection threshold, wherein determining the absence of the first input object used the detection touch threshold, detect the presence of the first input object using the first plurality of touch measurements and the reduced detection touch threshold.

7. The processing system of claim 6, wherein the processing circuitry is further configured to:
determine a sub-region of the sensing region in which the first input object is located,
wherein reducing the detection touch threshold is only for the sub-region.

8. The processing system of claim 1, wherein the processing circuitry is further configured to:
detect the absence of the first input object in the sensing region from a second plurality of force measurements;
detect the absence of the first input object in the sensing region from the second plurality of touch measurements; and
perform the relaxation of the force baseline at one selected from a group consisting of the normal rate of relaxation and an increased rate of relaxation, in response to the absence of the first input object detected from the second plurality of force measurements, and the absence of the first input object detected from the second plurality of touch measurements.

9. An input device for force baseline management, the input device comprising:
a plurality of sensor electrodes; and
a processing system coupled to the plurality of sensor electrodes and configured to:
obtain a first plurality of capacitive sensing signals of a sensing region from the plurality of sensor electrodes for a current state of the sensing region,
determine, from the first plurality of capacitive sensing signals, a first plurality of force measurements and a first plurality of touch measurements,
incorrectly detect a presence of a first input object in the sensing region from the first plurality of force measurements,
detect an absence of the first input object in the sensing region from the first plurality of touch measurements, and
perform a relaxation of a force baseline at a decreased rate in response to a presence of the first input object incorrectly detected from the first plurality of force measurements when the absence of the first input object is detected from the first plurality of touch measurements, the decreased rate being less than a normal rate of relaxation, the normal rate being used when no input object is detected in the sensing region using both touch measurements and force measurements.

10. The input device of claim 9, wherein the sensor circuitry is further configured to obtain a second plurality of capacitive measurements, and wherein the processing system is further configured to:
determine, from the second plurality of capacitive sensing signals, a second plurality of force measurements and a second plurality of touch measurements,
determine, from the second plurality of force measurements and the second plurality of touch measurements, an absence of a second input object from the sensing region, the second input object detected in a preceding frame, and
after a threshold amount of time of determining the absence of the second input object, perform the relaxation of the force baseline.

11. The input device of claim 10, wherein the threshold amount of time is a number of frames.

12. The input device of claim 10, wherein, after the threshold amount of time, the relaxation of the force baseline is at an increased rate.

13. The input device of claim 10, wherein, before the threshold amount of time, the relaxation of the force baseline is at the decreased rate.

14. The input device of claim 9, wherein the processing system is further configured to:
determine, from the first plurality of force measurements, a sub-region of the sensing region in which the first input object is located,
reduce a detection touch threshold to obtain a reduced detection threshold, wherein determining the absence of the first input object used the detection touch threshold,
detect the presence of the first input object using the first plurality of touch measurements and the reduced detection touch threshold.

15. The input device of claim 14, wherein the processing system is further configured to:
determine a sub-region of the sensing region in which the first input object is located,
wherein reducing the detection touch threshold is only for the sub-region.

16. A method for force baseline management, the method comprising:
determining, from a first plurality of capacitive sensing signals, a first plurality of force measurements and a first plurality of touch measurements for a current state of the sensing region;
incorrectly detecting a presence of a first input object in the sensing region from the first plurality of force measurements;
detecting an absence of the first input object in the sensing region from the first plurality of touch measurements; and
performing a relaxation of a force baseline at a decreased rate in response to a presence of the first input object incorrectly detected from the first plurality of force measurements when the absence of the first input object is detected from the first plurality of touch measurements, the decreased rate being less than a normal rate of relaxation, the normal rate being used when no input object is detected in the sensing region using both touch measurements and force measurements.

17. The method of claim 16, further comprising:
determining, from a second plurality of capacitive sensing signals, a second plurality of force measurements and a second plurality of touch measurements,
determining, from the second plurality of force measurements and the second plurality of touch measurements, an absence of a second input object from the sensing region, the second input object detected in a preceding frame, and
after a threshold amount of time of determining the absence of the second input object, performing the relaxation of the force baseline.

18. The method of claim 17, wherein the threshold amount of time is a number of frames.

19. The method of claim 17, wherein, after the threshold amount of time, the relaxation of the force baseline is at an increased rate.

20. The method of claim 16, further comprising:
determining, from the first plurality of force measurements, a sub-region of the sensing region in which the first input object is located, reducing a detection touch threshold to obtain a reduced detection threshold, wherein determining the absence of the first input object used the detection touch threshold, detecting the presence of the first input object using the first plurality of touch measurements and the reduced detection touch threshold.

21. The method of claim 16, further comprising:

determining a sub-region of the sensing region in which the first input object is located, wherein reducing the detection touch threshold is only for the sub-region.

\* \* \* \* \*